(12) United States Patent
Partiwala et al.

(10) Patent No.: US 11,379,337 B2
(45) Date of Patent: Jul. 5, 2022

(54) INCREASING CPU CLOCK SPEED TO IMPROVE SYSTEM PERFORMANCE

(71) Applicant: HEWLETT-PACKARD DEVELOPMENT COMPANY, L.P., Spring, TX (US)

(72) Inventors: Suketu Partiwala, Palo Alto, CA (US); Chihao Lo, Palo Alto, CA (US); Dhruv Jain, Palo Alto, CA (US); Jeff J Liu, Fremont, CA (US); Michael Leighton Nash, Clyde Hill, WA (US); Gary Calomeni, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,066

(22) PCT Filed: Jun. 21, 2018

(86) PCT No.: PCT/US2018/038713
§ 371 (c)(1),
(2) Date: Oct. 17, 2019

(87) PCT Pub. No.: WO2019/245558
PCT Pub. Date: Dec. 26, 2019

(65) Prior Publication Data
US 2021/0326232 A1 Oct. 21, 2021

(51) Int. Cl.
*G06F 1/08* (2006.01)
*G06F 11/34* (2006.01)
*G06F 11/30* (2006.01)

(52) U.S. Cl.
CPC ............ *G06F 11/3428* (2013.01); *G06F 1/08* (2013.01); *G06F 11/3024* (2013.01); *G06F 11/3062* (2013.01)

(58) Field of Classification Search
CPC .... G06F 11/3428; G06F 1/08; G06F 11/3024; G06F 11/33062
See application file for complete search history.

(56) References Cited

U.S. PATENT DOCUMENTS

| | | | |
|---|---|---|---|
| 7,382,366 B1 | 6/2008 | Klock et al. | |
| 8,380,968 B2 | 2/2013 | Huang et al. | |
| 8,443,209 B2* | 5/2013 | Nussbaum | G06F 1/324 713/300 |
| 8,739,154 B2* | 5/2014 | Thirumalai | G06F 8/63 717/172 |
| 8,935,558 B2 | 1/2015 | Chen | |

(Continued)

FOREIGN PATENT DOCUMENTS

| | | |
|---|---|---|
| EP | 0826170 A1 | 3/1998 |
| KR | 20110061401 A | 6/2011 |

(Continued)

*Primary Examiner* — Elias Desta
(74) *Attorney, Agent, or Firm* — HP Inc. Patent Department

(57) ABSTRACT

A method of automatic overclocking of a silicon part or chip, such as a central processing unit (CPU) is disclosed. A range of clock frequencies of both the CPU and a cache of a computer system are tested, with parameters being monitored, safety limits of the computer system being ensured, and benchmark tests being run, before arriving at a CPU and cache frequencies based on a selected benchmark score.

22 Claims, 9 Drawing Sheets

(56) References Cited

U.S. PATENT DOCUMENTS

| | | |
|---|---|---|
| 9,354,689 B2 | 5/2016 | Bhandaru et al. |
| 9,436,245 B2 | 9/2016 | Bhandaru et al. |
| 9,618,997 B2 | 4/2017 | Ananthakrishnan et al. |
| 9,703,358 B2 | 7/2017 | Kumar |
| 2005/0010836 A1* | 1/2005 | Bae ........................ G11B 27/36 714/25 |
| 2010/0125436 A1 | 5/2010 | Chase et al. |
| 2014/0136823 A1 | 5/2014 | Ragland et al. |
| 2017/0131754 A1 | 5/2017 | Zobel et al. |

FOREIGN PATENT DOCUMENTS

| | | |
|---|---|---|
| TW | M533249 | 12/2016 |
| TW | M549371 | 9/2017 |
| WO | 97/32246 A1 | 9/1997 |
| WO | WO-2011011668 A1 | 1/2011 |

\* cited by examiner

200 auto overclocking system graphical user interface (116)

welcome to the alpha gaming system!

would you like to optimize your gaming experience?

yes — 302

INCREASING CPU CLOCK SPEED TO IMPROVE SYSTEM PERFORMANCE

BACKGROUND

The manufacture of chips, such as application specific integrated circuits (ASICs) or central processing units (CPUs), is a complex process. Small variations in material across the wafer from which a chip is formed can cause significant differences in performance. Apart from material variations, there are manufacturing process-related variations in chemical depositions, lithography, metal deposition, temperature controls, and so on, which can further result in differences between chips.

Chip manufacturers often resort to a binning strategy in which chips are collected into different bins based on performance, then the bins are separately sold, some as part of a lottery. Each bin is guaranteed to have some stock performance, but anything beyond that depends upon the buyer's luck.

The chips that are part of a silicon lottery are unlocked, enabling the user to employ overclocking, or increasing the operating frequency, on them. Some gaming systems, for example, are sold with unlocked CPUs, whether from silicon lottery purchases or from other sources. These gaming systems may lack tools to facilitate overclocking, and thus the opportunity to enhance system performance is missed.

Overclocking may be utilized successfully by those with an in-depth knowledge of computer architecture and tools for extracting the performance out of the silicon. For others, hours of frustration and risk may accompany such endeavors.

BRIEF DESCRIPTION OF THE DRAWINGS

Certain examples are described in the following detailed description and in reference to the drawings, in which:

FIG. 3 is an example graphical user interface in which the automatic overclocking system of FIG. 1 is activated, according to examples.

The same numbers are used throughout the disclosure and the figures to reference like components and features. Numbers in the 100 series refer to features originally found in FIG. 1, numbers in the 200 series refer to features originally found in FIG. 2, and so on.

DETAILED DESCRIPTION

In accordance with the examples described herein, a system of automatic overclocking of a silicon part or chip, such as a central processing unit (CPU) is disclosed. Via an interface, a user may run a program that automatically tests the range of clock frequencies of both the CPU and a cache of a computer system.

Figure 1:
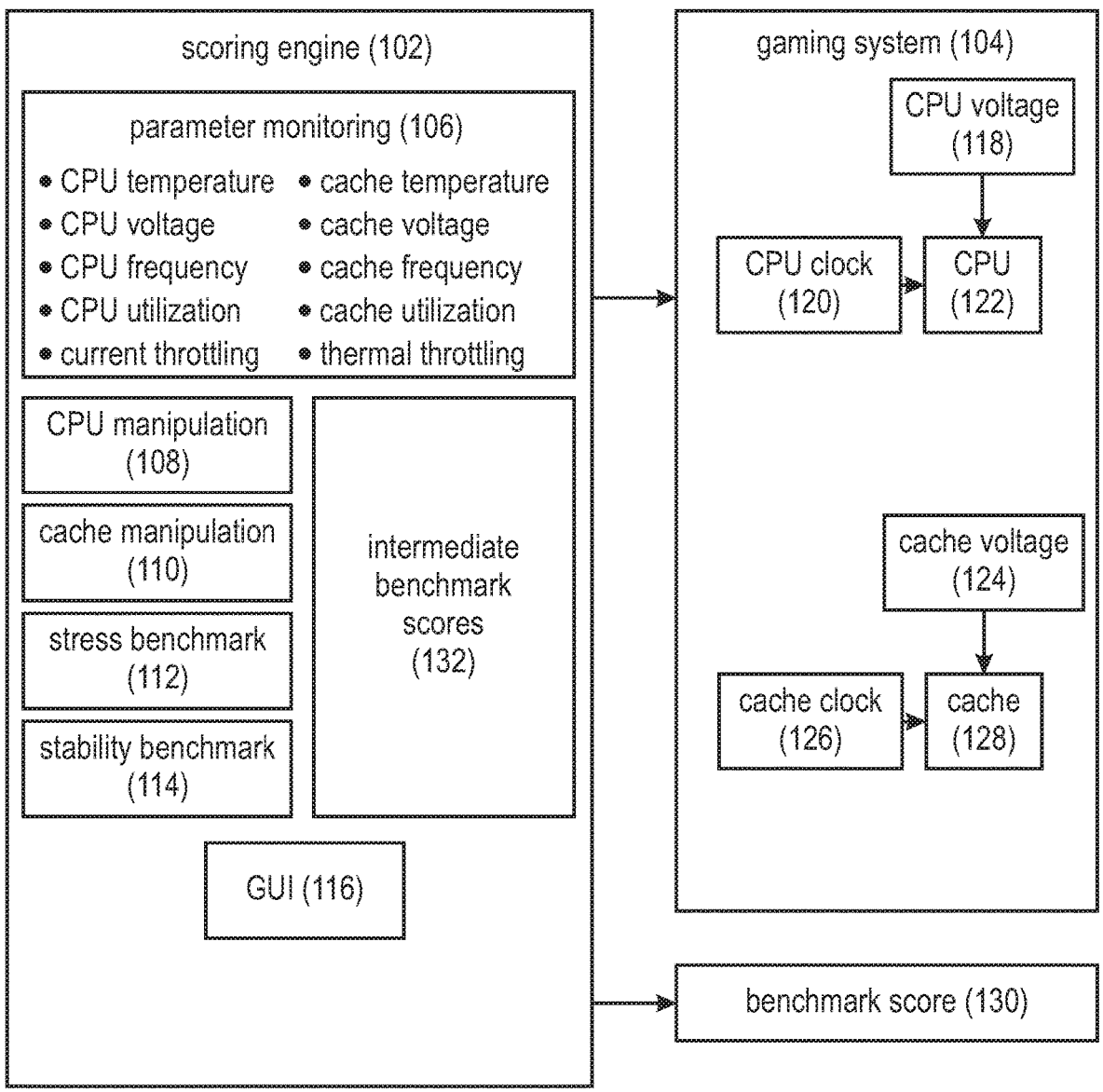
FIG. 1 is a schematic diagram of an automatic overclocking system, according to examples.

FIG. 1 is a schematic diagram of an automatic overclocking system 100, according to examples. The automatic overclocking system 100 is a tool to be executed upon a computer system, such as a gaming system 104, having a CPU, but which also may comprise multiple CPUs, as well as a cache or multiple caches. As used herein, a gaming system is a computing device, such as a laptop computer, which may have a special keyboard or mouse, a high-end graphics chip and video interface, and other features designed for use with gaming programs, and a gaming system also includes a general purpose computer. The gaming system 104 may include a multi-core processor having independent operating cores. Although the examples described herein reference a CPU and a cache, the automatic overclocking system 100 may be performed on any computer system comprising a chip whose speed and voltage are adjustable.

The automatic overclocking system 100 executes a scoring engine 102 upon the gaming system 104. In an example, the scoring engine 102 includes code blocks stored in a storage device of the gaming system or other system under test. In some examples, part or all of the scoring system is implemented in a hardware device, such as an application specific integrated circuit (ASIC). In addition to monitoring parameters 106 of the gaming system 104, the scoring engine 102 also systematically performs CPU manipulation 108 and cache manipulation 110 and obtains intermediate benchmark scores 132 during each modification, resulting in a select benchmark score 130. Both a stress benchmark 112 and a stability benchmark 114 are run periodically in arriving at the intermediate 132 and 130 select benchmark scores.

The CPU manipulation 108 of the scoring engine 102 finds a stable CPU frequency at which the CPU becomes unstable. The scoring engine 102 repeatedly increases the CPU frequency, in small or big steps depending on the available headroom, until the system under test becomes unstable. As used herein, headroom refers to a range of units, or a window, in which modification from a starting unit is made. Thus, where CPU frequency is the unit being measured, the headroom is an available range of frequencies from which the CPU frequency may be modified. During this process, the CPU voltage is also increased incrementally to further help in increasing the CPU operating speed. The stability benchmark 114 is run after each increment to ascertain the stability of the system, and various system parameters are monitored to ensure they remain within operating limits, such as temperature, among others. The stability benchmark 114 thus performs a quick check to ensure the system under test is stable for the system parameters. At the end of the CPU manipulation 108, the selected stable CPU frequency (StableCPUFreq) and its corresponding voltage (CPUVoltage) are determined.

Further, the scoring engine 102 of the automatic overclocking system 100 includes cache manipulation, in which a stable cache frequency is obtained. Similar to the analysis for CPU frequency, a stable cache operating frequency and voltage are determined. A stability benchmark is run to determine stability of the system under test, during which system parameters are again monitored. In an example, the stability benchmark is a quick program, meant to verify stability under an instantaneous predetermined load rather than under sustained loading conditions. At the end of the cache manipulation 110, a stable cache frequency (Stable-CacheFreq) and its corresponding voltage (CacheVoltage) are determined.

Next, a combined stable operating point is sought for both CPU and cache frequencies. Once this is found, the CPU and cache frequencies are reduced somewhat, such as a couple of frequency steps lower than the stable amounts. The granularity of reducing, or stepping down from, the frequencies may be the same as the granularity used to increase, or step up, the frequencies, or may be different. Further, the granularity of changing the CPU frequency may be different from that of the cache frequency. Once the frequencies have been lowered somewhat, the more rigorous stress benchmark 112 is executed upon the system under test. In an example, the stress benchmark tests the system under sustained loading conditions while the stability benchmark tests under instantaneous predetermined load. The CPU manipulation 108, cache manipulation 110, stress benchmark 112, and stability benchmark 114 are described in more detail in the flow diagram of FIGS. 4A-4B, below.

Figure 2:
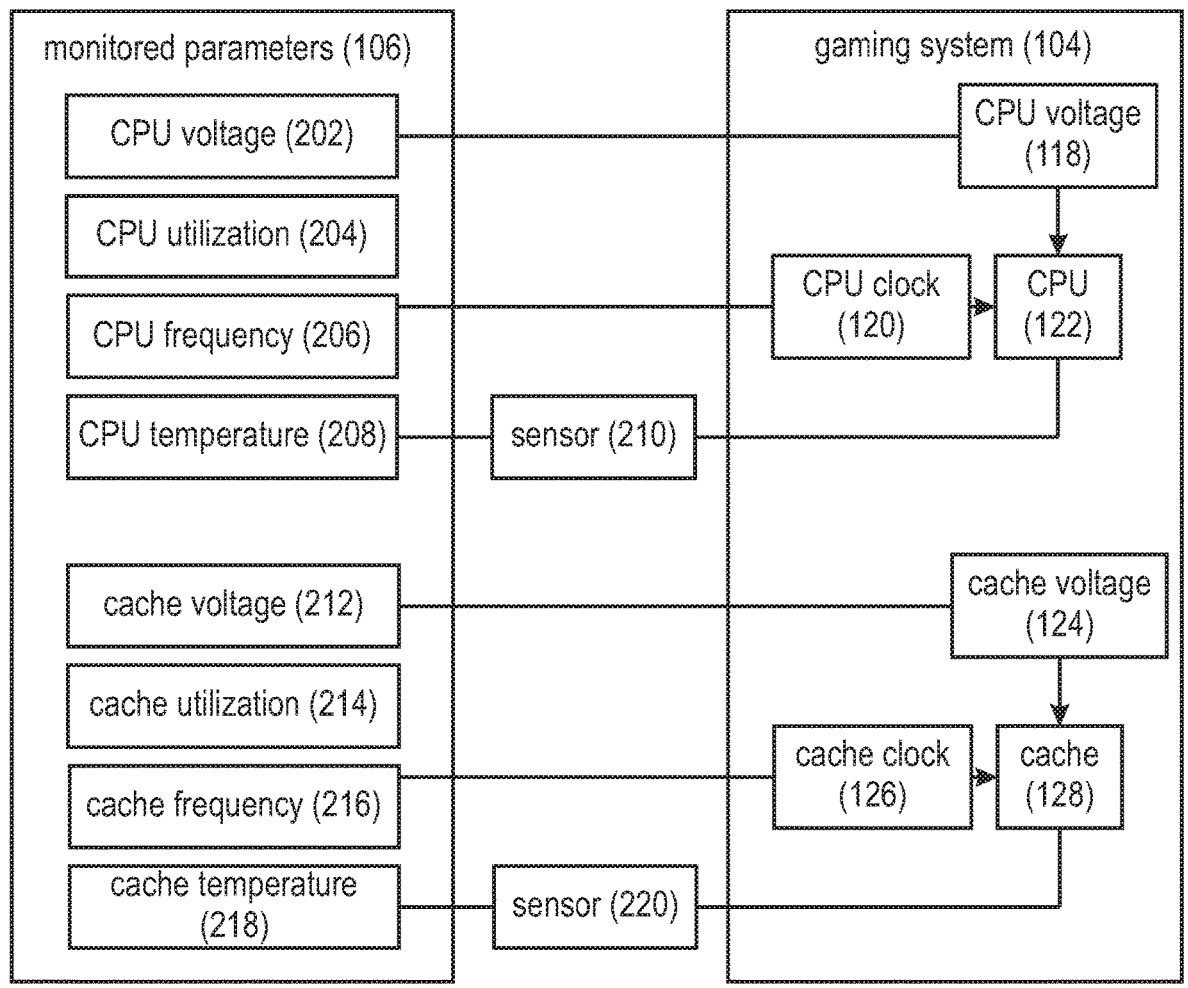
FIG. 2 is a schematic diagram showing how parameters are monitored by the automatic overclocking system of FIG. 1, according to examples.

FIG. 2 is a schematic diagram showing how parameters are monitored by the automatic overclocking system of FIG. 1, according to examples. The monitored parameters 106 include CPU voltage 202, CPU utilization 204, CPU frequency 206, and CPU temperature 208, as monitored by sensor 210. Where the gaming system further includes a cache such as the cache 128, the monitored parameters 106 further include cache voltage 212, cache utilization 214, cache frequency 216, and cache temperature 218, as monitored by sensor 220.

Sensors 210 and 220 coupled to the CPU 122 and cache 128, respectively, enable the temperature of each to be monitored, resulting in the CPU temperature 208 and cache temperature 218, respectively. The monitored parameter, CPU voltage 202, is coupled to a CPU voltage 118 used to drive the CPU 122. The monitored parameter, cache voltage 212, is coupled to a cache voltage 124 used to drive the cache 128.

The monitored parameter, CPU frequency 206, is coupled to a CPU clock 120 of the CPU 122, where the CPU clock controls the speed at which the CPU executes instructions. The monitored parameter, cache frequency 216, is coupled to a cache clock 126 of the cache 128, where the cache clock controls the speed at which the cache stores instructions. The monitored parameters, CPU utilization 204 and cache utilization 214, are obtained by measuring the number of instructions executed and cached, respectively, between two time periods.

In an example, the CPU and cache utilization measurements are obtained based on indicators provided by the CPU and cache chip vendors. For example, CPU utilization may be based on the following logic:

CPU_utilization=c0_time*(aperf/mperf);

where c0_time=mperf_diff/sel_freq;

where mperf is a fixed counter and increments at a guaranteed frequency of the core and aperf increments at the current operating frequency of a core, that is, aperf accounts for throttling turbo, and so on. Similarly, current throttling and thermal throttling parameters are obtained based on indicators from the chip manufacturers.

Manual overclocking is a complex process that is possible for those users with an in-depth knowledge of the hardware, firmware, and software of the computer system. Understanding the CPU, as well as and the parameters involved in controlling its performance, such as voltage, frequency, current, and thermal heat, are part of the knowledge base. Understanding the relationship between performance and frequency of the CPU clock, how the clock frequency is related to the voltage and power supplied to the CPU, how heat is related to the clock frequency, throttling, and issues of extreme thermals, are all relevant considerations when overclocking. Understanding power delivery solutions and how much power may be delivered for short durations versus average sustained power are also relevant. The nuances of any particular system, such as knowing the temperature limit of the CPU, are also considered in any overclocking plan.

Additionally, the process of manual overclocking is likely to involve the investigation and learning about various overclocking tools, as well as monitoring the system during the process. The basic input output system (BIOS) of the computer system may also be tweaked during overclocking. Trial and error iterations consuming many hours are common with manual overclocking.

FIG. 3 is a simplified diagram of the graphical user interface of the automatic overclocking system of FIG. 1, according to examples. In one example, the automatic overclocking system 100 automates the process of optimizing the gaming system 104 by a simple click of a button 302, such as is selectable from the GUI 116. Gaming machines, such as laptop computers with special keyboard, mouse, and other features designed for gaming programs, are often bundled with software programs including a user interface to support the gaming. In one example, the automatic overclocking system 100 is activated by selecting the button 302. By shortening the time to overclock the system, and by automatically providing a stable system, a beneficial user experience may result.

Some motherboard manufactures, including those of gaming machines, include an overclocking tool. The tool may, for example, enter BIOS mode and activating an "overclock" feature of the CPU. The subsequent overclocking of the CPU is then based on predefined profiles created by the manufacturer. These profiles are not customized for each system but are common to groups of systems having similar hardware. Therefore, the profiles of these overclocking tools tend to be conservative and do not generally take advantage of the full capabilities of the CPU or cache. The existing overclocking tools fail to fully automate the process, as users are still subjected to trial and error experiments with their systems. While parameters such as CPU frequency, cache frequency, and core voltage may be modified, parameters such as Turbo Boost power are unavailable with these tools. Turbo Boost is an Intel tradename for a feature of some CPUs in which the operating frequency is automatically increased when a running task demands more performance. Turbo Boost is assumed to be on by default. Turbo Boost enables a narrow range of increased performance. The automatic overclocking tool 100 is capable of further increasing the CPU speed above that obtained by the Turbo Boost feature.

Apart from the risk of permanent damage to the gaming system, manual overclocking may lead to increased instability of the gaming system. Thus, there is a segment of the gaming market in which the capability of the automatic overclocking system 100 would be attractive.

Figure 4A:
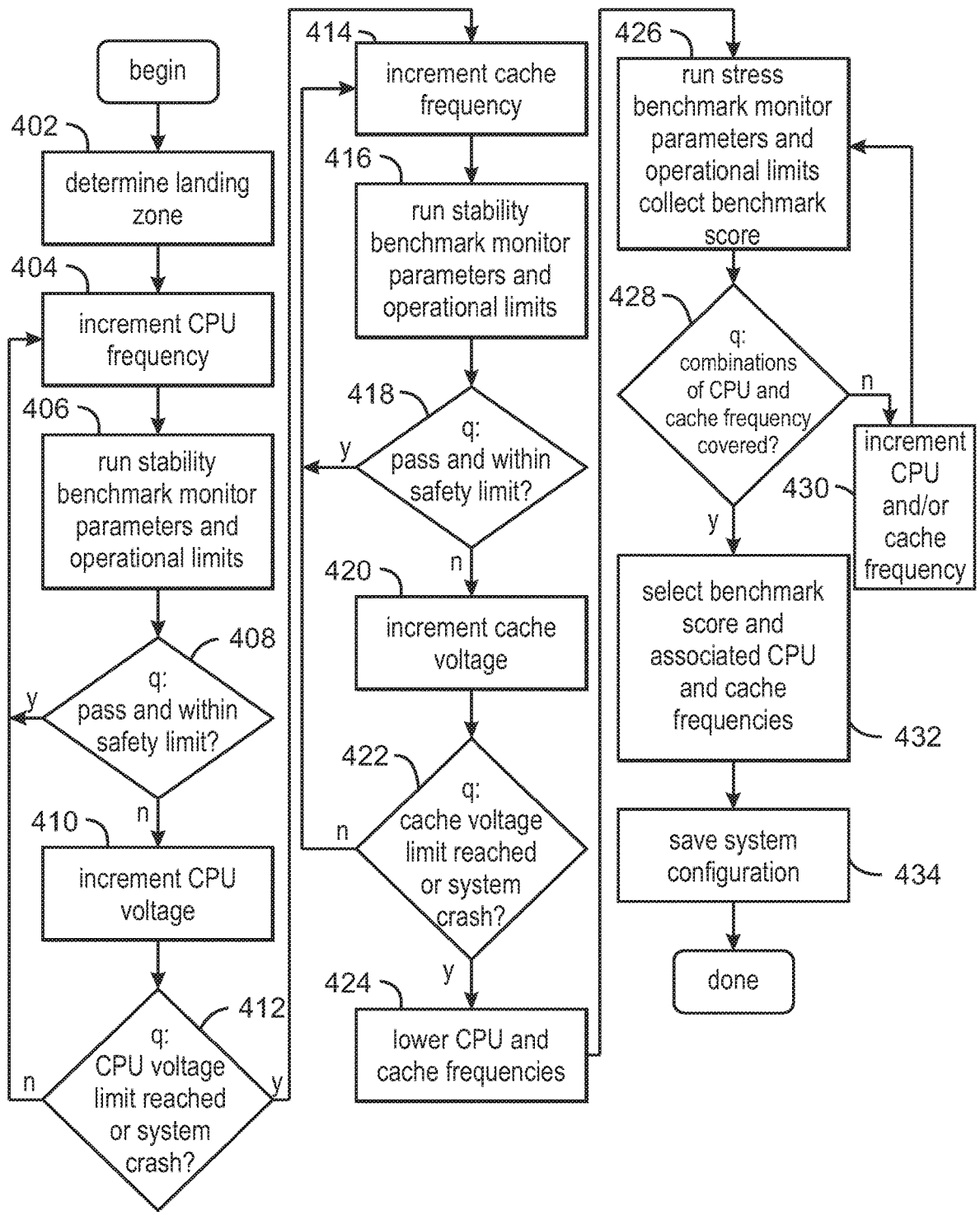
FIGS. 4A and 4B are flow diagrams depicting operations of the automatic overclocking system of FIG. 1, according to examples.
Figure 4B:
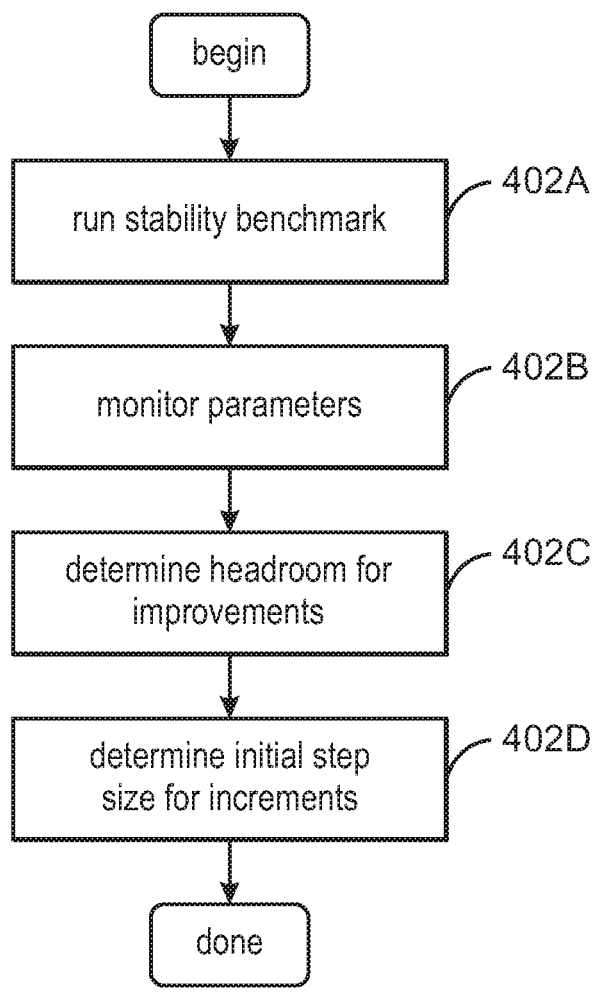

FIGS. 4A and 4B are flow diagrams illustrating steps to be performed by the automatic overclocking system of FIG. 1 upon a system under test, such as the gaming system 104 above, according to examples. The operations 400 begin in FIG. 4A by determining a landing zone of the system under test (block 402). The landing zone of the system under test is the initial state in which the stability benchmark is run, parameters are monitored, and both the headroom and step size increments are decided upon. Operations performed during the landing zone determination are described in FIG. 4B, below.

Recall from FIG. 1 that the automatic overclocking system 100 includes a scoring engine 102 designed to produce the benchmark score 130 that results in an optimized configuration for the gaming system 104. The scoring engine 102 includes both CPU manipulation 108 and cache manipulation 110. These operations are independent of one another, in one example, and CPU manipulation 108 may be performed before or after cache manipulation. The steps 404, 406, 408, 410, and 412 of FIG. 4A correspond to CPU manipulation 108 while steps 414, 416, 418, 420, and 422 correspond to cache manipulation 110. Although showing first in the flow diagram, the CPU manipulation steps may be performed after the cache manipulation steps.

Once the landing zone is determined, both a headroom (or range) for improving the CPU and cache frequencies and voltages and a rate of change (step size) of the parameters has been determined. Next, the CPU frequency of the system under test is incremented, based on the increment step size (block 404). The stability benchmark is again run and parameters and operating limits, such as those specified by the chip manufacturer (block 406). For example, a safe temperature limit of the CPU may be specified as 90° C. The stability benchmark is designed to determine the basic stability of the system under test. In one example, the stability benchmark targets the CPU by running a heavy load, fully utilizing the CPU and its caches. During the test, the CPUs are racing to whatever CPU frequency/voltage has been set, and thus indicates whether the CPU can even reach the frequency set by the automatic overclocking tool.

From the flow diagrams and pseudo-code, it can be seen that the stability benchmark is run several times. In one example, the stability benchmark takes one to two seconds of runtime execution. In one example, a successful run of the stability benchmark generates a score. A failure of the stability benchmark may cause a system failure, indicated by no video display or a hang indication, such as a blue screen.

Next, a query is made whether the stability benchmark passed and the system under test is within operating limits, such as temperature, among others (block 408). If so, the CPU frequency is incremented again (block 404) and the process is repeated. Otherwise, the CPU frequency is maintained at its current speed and the CPU voltage is incremented (block 410).

A query is then made whether a CPU voltage limit has been reached or the system under test has crashed (block 412). In an example, the CPU voltage limit is part of the specifications established by the chip manufacturer. If not, the CPU frequency is incremented again (block 404), this time with an increased CPU voltage, and the process is repeated. If, instead, the CPU voltage limit has been reached or the system under test has crashed, the automatic overclocking system leaves the CPU frequency and voltage in their current states and moves on to manipulation of the cache of the system under test.

As described with respect to FIG. 4B, the landing zone queries determined the range and rate of change for the cache frequency and voltage as well. So, the automatic overclocking system 100 changes the cache frequency by the step increment (block 414). At the new cache frequency, the stability benchmark is run and parameters and operating limits, such as temperature, among others, are monitored (block 416).

A query is then made whether the stability benchmark passed and the system under test is within operating limits, such as temperature (block 418). If so, the cache frequency is incremented again (block 414) and the process is repeated. Otherwise, the cache frequency is maintained at its current speed and the cache voltage is increased (block 420).

A query is then made whether a cache voltage limit has been reached or the system under test has crashed (block 422). In an example, the cache voltage limit is part of the specifications established by the chip manufacturer. If not, the cache frequency is incremented again (block 414), this time with an increased cache voltage, and the process is repeated. If, instead, the cache voltage limit has been reached or the system under test has crashed, the automatic overclocking system now knows the stable CPU frequency and voltage as well as the stable cache frequency and voltage based on the CPU and cache manipulations performed so far.

At this point, the CPU and cache frequencies are dialed down or lowered from their current values (block 424), based on observations and experimentation, in some examples. A window of CPU frequencies and a separate window of cache frequencies is decided upon. Thus, if the breaking frequency for the CPU is X and the breaking frequency for the cache is Y, the lowered frequencies may be X−300 and Y−300. Thus, for the CPU, the range of frequencies is X−300 to X and the range for the cache is Y−300 to Y. Combinations may be made from these windows, with the benchmarks being run for each of them.

The stress benchmark test is run, during which the parameters and operating limits, such as temperature, are monitored (block 426). At this step, a benchmark score resulting from the stress benchmark test is also collected, which would correspond to the intermediate benchmark scores 132 of FIG. 1.

In examples, the stress benchmark is more rigorous than the stability benchmark and is designed to stress test the system under test. In one example, the stress benchmark is run long enough to determine a sustained thermal effect on the system. In another example, the stress benchmark is based off a Prime95 open source benchmark that is publicly available. In another example, the stress benchmark targets the CPU's integer and floating point units by executing Fast Fourier Transforms, thus putting all CPU cores under an extreme load, thus measuring the full power draw of the system under test. By stressing the system under test more than normal day-to-day usage, the automatic overclocking tool is able to identify instability issues by increasing the demands on the system under test beyond what would occur normally. Running the stress test results in the benchmark score, which indicates performance of the system under test based on the current CPU and cache frequencies and voltages.

Until all combinations of CPU and cache frequencies within a window have been evaluated (block 428), either the CPU frequency or cache frequency, or both, are incremented (block 430). Based on the new values, the stress benchmark is run again, parameters and operating limits, such as temperature, are monitored, and a new intermediate benchmark score is obtained (block 426).

Once the combinations of CPU and cache frequencies within the window have been considered (block 428), the benchmark scores from each iteration of the test are compared (block 432). A combination of the stable benchmark score and associated CPU and cache frequencies are selected (block 432), where each intermediate benchmark score is associated with a given CPU frequency and a given cache frequency. The system under test at the given CPU and cache frequencies is saved as its new configuration (block 434).

FIG. 4B is a technique for determining the landing zone, as described with respect to block 402 of FIG. 4A. The landing zone is a starting point for subsequent analysis of the automatic overclocking system 100. A stability benchmark is run (block 402A). Parameters, such as the parameters in FIGS. 1 and 2, are monitored (block 402B). Based on this initial analysis, whatever headroom for modification of the system under test is determined (block 402C). And, an initial step size for incrementing the CPU and/or cache frequencies is determined (block 402D).

In the initial landing zone analysis, the stability benchmark is run on the default configuration of the system under test. System parameters, such as CPU temperature, current throttling, thermal throttling, and so on, are monitored. Based on the parameter values, a determination is made of how much of a change window, or headroom, is available for tweaking the system parameters. Thus, for example, if the average temperatures are less than 40° C. and there is no power throttling, there may be a window in which the CPU frequency may be increased. In a second example, if temperatures are measured in excess of 80° C. and there is some power throttling, there may not be much headroom left in the system under test for additional tweaking.

Based on the available headroom, a granularity of modifying CPU and/or cache frequency is determined. For example, with a sizeable headroom, the CPU speed may be changed in 500 MHz increments. With a smaller headroom, the CPU speed may instead be changed in 100 MHz increments.

In examples, the automatic overclocking system 100 relies on finding individual breaking points or ceilings for CPU speed, cache speed, CPU voltage, and cache voltage, then lowering these values for a combined configuration, as illustrated in the flow diagram of FIGS. 4A-4B and in the pseudo-code of FIGS. 5A-5D.

The analysis of the benchmark scores and subsequent preservation of an updated system configuration may be illustrated with some examples. Leaving CPU and cache voltages out of the analysis for now, suppose, for example, the stable CPU frequency for the system under test is X MHz and the stable cache frequency is Y MHz. The granularity of change is A for the CPU and B for the cache. Then, suppose the method 100 dials back two CPU and two cache frequencies.

Table 1 shows the combinations of CPU and cache frequencies to test. The table shows that, with two additional frequencies for each of the CPU and cache, there are nine configurations to be tested.

TABLE 1

Combination of CPU and cache frequencies to test

| in MHz | | stable CPU freq | $1^{st}$ CPU drop | $2^{nd}$ CPU drop |
|---|---|---|---|---|
| | | X | X − A | X − 2A |
| stable cache freq | Y | X & Y | X − A & Y | X − 2A & Y |
| $1^{st}$ cache drop | Y − B | X & Y − B | X − A & Y − B | X − 2A & Y − B |
| $2^{nd}$ cache drop | Y − 2B | X & Y − 2B | X − A & Y − 2B | X − 2A & Y − 2B |

Thus, the automatic overclocking system 100 finds a combined stable operating point of the system under test, by testing several different combinations of CPU and cache frequencies below the measured stable frequencies of each. The more rigorous stress benchmark for each configuration is run, resulting in multiple benchmark scores. Thus, in the example of Table 1, there would be nine different benchmark scores based on the nine combinations of CPU and cache frequencies. Additionally, other parameters and operating limits are monitored.

Table 2 shows hypothetical benchmark scores for a CPU and cache with the characteristics of Table 1, above. Each of the CPU frequencies and cache frequencies are considered stable, due to the analysis of FIG. 4A, above. The benchmark scores are compared to determine a stable score at a selected CPU frequency and selected cache frequency.

TABLE 2

Benchmark scores

| in MHz | | stable CPU freq | $1^{st}$ CPU drop | $2^{nd}$ CPU drop |
|---|---|---|---|---|
| | | X | X − A | X − 2A |
| stable cache freq | Y | 5 | 4 | 7 |
| $1^{st}$ cache drop | Y − B | 4 | 4 | 6 |
| $2^{nd}$ cache drop | Y − 2B | 7 | 5 | 6 |

In Table 2, a selected benchmark score of 7 and is found in two places in the table. The benchmark score of 7 results when the CPU frequency is X and the cache frequency is Y−2B and when the CPU frequency is X−2A and the cache frequency is Y. The selected CPU and cache frequencies at the corresponding voltages are then saved as a stable overclocked configuration for the system under test. In an example, the configuration with the CPU frequency being at X and the cache frequency being at Y−2B is selected.

During operation of the automatic overclocking system 100, operational parameters like temperature and power are continuously monitored, in some examples. Where the operational parameters approach device limits, the stress benchmark is stopped and the CPU and/or cache frequencies are lowered to move the system back into a safety zone.

In another example, the stress benchmark is run and intermediate benchmark scores are obtained during each iteration, such as each increase in CPU frequency or voltage. If the benchmark scores do not improve on further increasing the CPU and/or cache frequencies, frequency increments are stopped. In the case where multiple runs of the stress benchmark result in same results, the automatic overclocking system 100 picks the benchmark score associated with lowest CPU and/or cache frequencies.

In examples, the automatic overclocking system 100 assumes the ambient temperature of the system under test does not change drastically. In circumstances in which the ambient temperature of the system does change significantly, the automatic overclocking system may be rerun to find a new operating configuration of the system under test.

Silicon aging is an ongoing issue from which no system is immune. Overclocking the CPU and/or cache frequencies may actually exasperate silicon aging. To mitigate this, in some examples, the automatic overclocking system 100 is run at regular intervals, such as once a month or once a year. As the system and its internal silicon parts age, by rerunning the automatic overclocking tool, the MaxStableCPUFreq and MaxStableCacheFreq may decrease over time.

In some examples, the automatic overclocking system 100 performs, via machine-readable instructions, such as a software program, running on the system under test, gathers system parameters for the idle system, monitors parameters, and runs a stability benchmark to determine changes in parameters like temperature, CPU utilization, CPU frequency, and so on. The machine-readable instructions, such as a software program running on the system under test, then determines if there are changes in parameters. Based on those changes as well as the values of the parameters, the software program determines a step size for increasing the CPU and cache frequency. If there is a sizeable headroom, a coarser/bigger step, such as 500 MHz increments, is chosen for each of the CPU and cache frequencies. If instead the monitored parameter values are already approaching limits, a finer/smaller step, such as 100 MHz increments, is chosen for each of the CPU and cache frequencies. The initial CPU and cache frequencies are saved.

For the CPU testing, following the stepwise increases, a stable CPU frequency is sought before the system under test fails. Known good configuration parameters are saved, in case the system crashes or reboots. The CPU frequency is incremented by the chosen step, the stability benchmark is run, and the parameters are monitored, with continuous monitoring of the system taking place, with an eye toward safety violations like over-temperature, over-current, and so on. If any parameter limits are violated, the benchmark is stopped, and the stable configuration is saved.

Where the stability benchmark is run successfully, the CPU frequency is incremented, and the process is repeated. The processes of incrementing, testing, and monitoring are repeated until the stability benchmark fails or a safety violation of the system under test occurs, at which point the stable system configuration is saved.

At this stage, the CPU voltage is increased and the CPU, restored to an initial state, then the CPU frequency increments, stability test execution, and parameter monitoring are repeated until either the benchmark test fails or the system under test encounters a safety violation. At this point, a stable CPU frequency and associated CPU voltage are saved.

Before starting the cache frequency manipulation test, the CPU configuration is restored to a baseline value. For the cache testing, a stable cache frequency is sought before the system under test fails. Known good configuration parameters are saved, in case the system crashes or reboots. The cache frequency is incremented by the chosen step, the stability benchmark is run, and the parameters are monitored, with continuous monitoring of the system taking place, with an eye toward safety violations like over-temperature, over-current, and so on. If any parameter limits are violated, the benchmark is stopped, and the stable configuration is saved.

Where the stability benchmark is run successfully, the cache, restored to an initial state, then the cache frequency is incremented, and the process is repeated. The processes of incrementing, testing, and monitoring are repeated until the stability benchmark fails or a safety violation of the system under test occurs, at which point the stable system configuration is saved.

At this stage, the cache voltage is increased and the cache frequency increments, stability test execution, and parameter monitoring are repeated until either the benchmark test fails or the system under test encounters a safety violation. At this point, a stable cache frequency and associated cache voltage are saved.

Once the combined CPU and cache frequencies at the respective voltages are determined, the CPU frequency is stepped back a couple of iterations and the cache frequency is stepped back a couple of iterations. At this point, the stress benchmark is run across all combinations of CPU frequencies and cache frequencies between the stepped back amounts and the stable amounts, with a benchmark score being generated for each. During each stress test, the parameters are monitored and, at the stable CPU and cache frequencies in which the benchmark is successful, the system configuration is saved. One of the benchmark scores during the runs is selected, and the configuration of the system under test at the selected benchmark score is saved.

Figure 5:
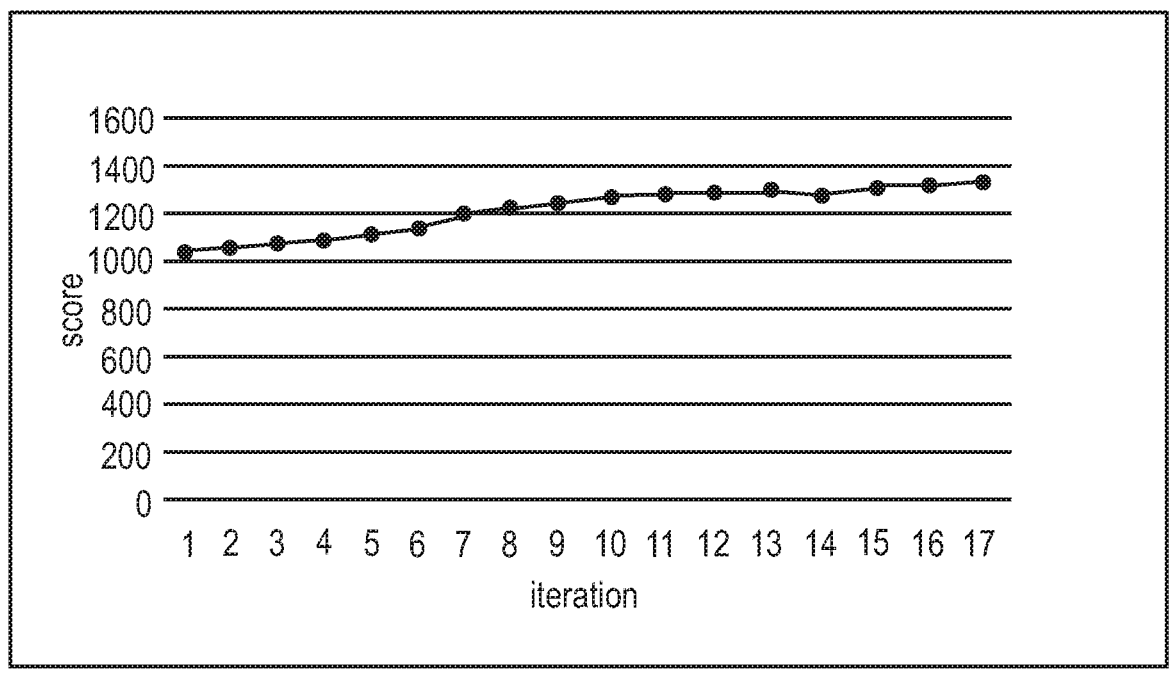
FIG. 5 is a graph illustrating the benchmarking scores obtained by running the automatic overclocking system of FIG. 1 for fifteen minutes, according to examples.

FIG. 5 is a graph 500 showing results of running the automatic overclocking system 100, according to examples. In one example, a performance modification of 30% is found within fifteen minutes of running the tool. The Y axis shows a stress benchmark score, which is based on a Prime95 CPU benchmark test, whereas the X axis shows the iteration count. In this example, by running the automatic overclocking tool, the benchmark score was raised from 1028 to 1340 in 17 iterations.

Figure 6:
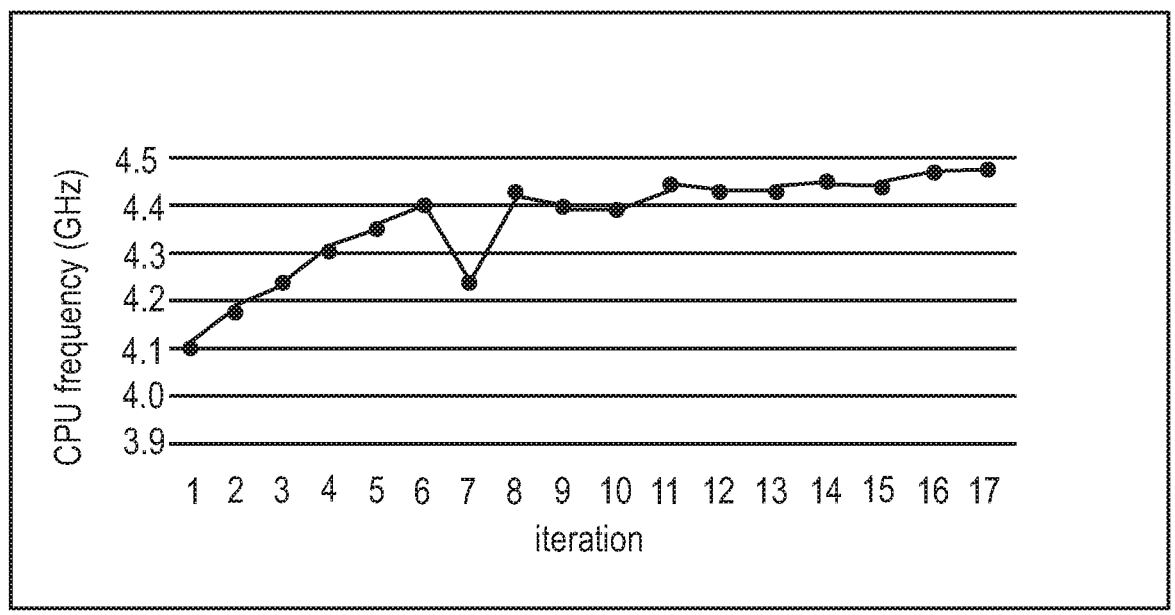
FIG. 6 is a graph illustrating the CPU frequency associated with the benchmark scores of FIG. 5, according to examples.

FIG. 6 is a graph 600 showing the relationship between the CPU frequency and the benchmark score when running the automatic overclocking tool 100. In 17 iterations, the CPU frequency was increased from 4.1 GHz to almost 4.5 GHz. Due to the safeguards illustrated above, a user running the automatic overclocking tool can be satisfied that the 4.5 GHz is a safe CPU operating speed for the system under test.

Figures 7A, 7B:
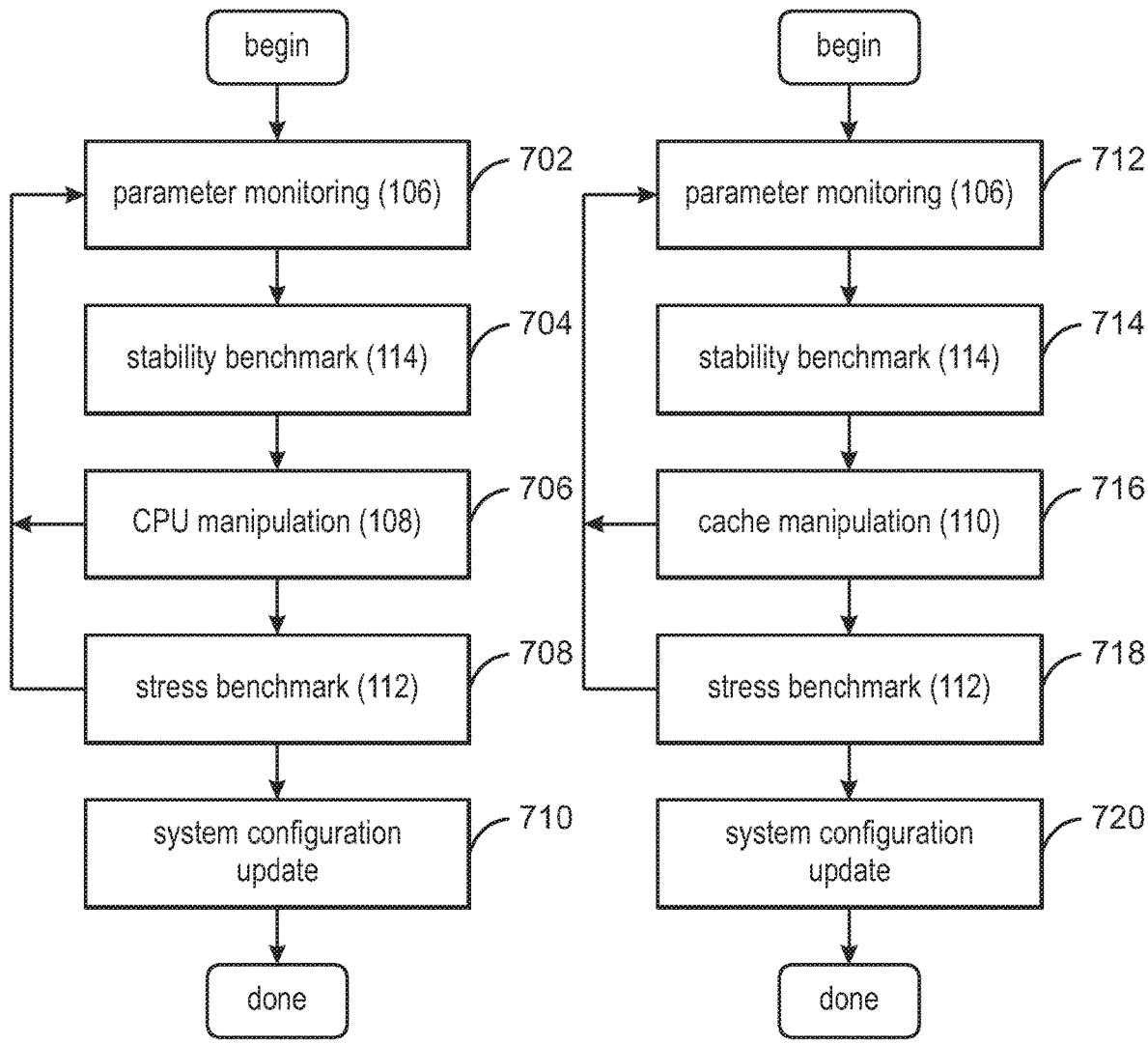
FIGS. 7A and 7B are flow diagrams depicting operations of the automatic overclocking system of FIG. 1, according to examples.

FIGS. 7A and 7B are flow diagrams 700A and 700B, illustrating capabilities of the automatic overclocking system of FIG. 1, according to examples. The schematic elements of FIG. 1, namely the parameter monitoring 106, the CPU manipulation 108, cache manipulation 110, stress benchmark 112, and stability benchmark 114, are featured. The flow diagram 700A features CPU manipulation while the flow diagram 700B features cache manipulation.

In the flow diagram 700A, the parameters of the system under test are monitored (block 702), and the stability benchmark is run (block 704). These operations may occur in reverse order. The CPU is then manipulated, as described above (block 706), which includes both changes in the CPU operating frequency and voltage. These three steps are iteratively repeated until a modified stable CPU operating frequency and associated voltage are obtained (arrow moving from block 706 to block 702). The more rigorous stress benchmark test is run (block 708), and this could also result in iteratively monitoring the parameters, running the stability benchmark test, and manipulating the CPU frequency and voltage (arrow moving from block 708 to block 702). Once a satisfactory benchmark score is reached, the system configuration is updated (block 710) with the new CPU frequency and voltage.

In the flow diagram 700B, the parameters of the system under test are monitored (block 712), and the stability benchmark is run (block 714). These operations may occur in reverse order. The cache is then manipulated, as described above (block 716), which includes both changes in the cache operating frequency and voltage. These three steps are iteratively repeated until a modified stable cache operating frequency and associated voltage are obtained (arrow moving from block 716 to block 712). The more rigorous stress benchmark test is run (block 718), and this could also result in iteratively monitoring the parameters, running the stability benchmark test, and manipulating the cache frequency and voltage (arrow moving from block 718 to block 712). Once a satisfactory benchmark score is reached, the system configuration is updated (block 720) with the new cache frequency and voltage.

Figure 8:
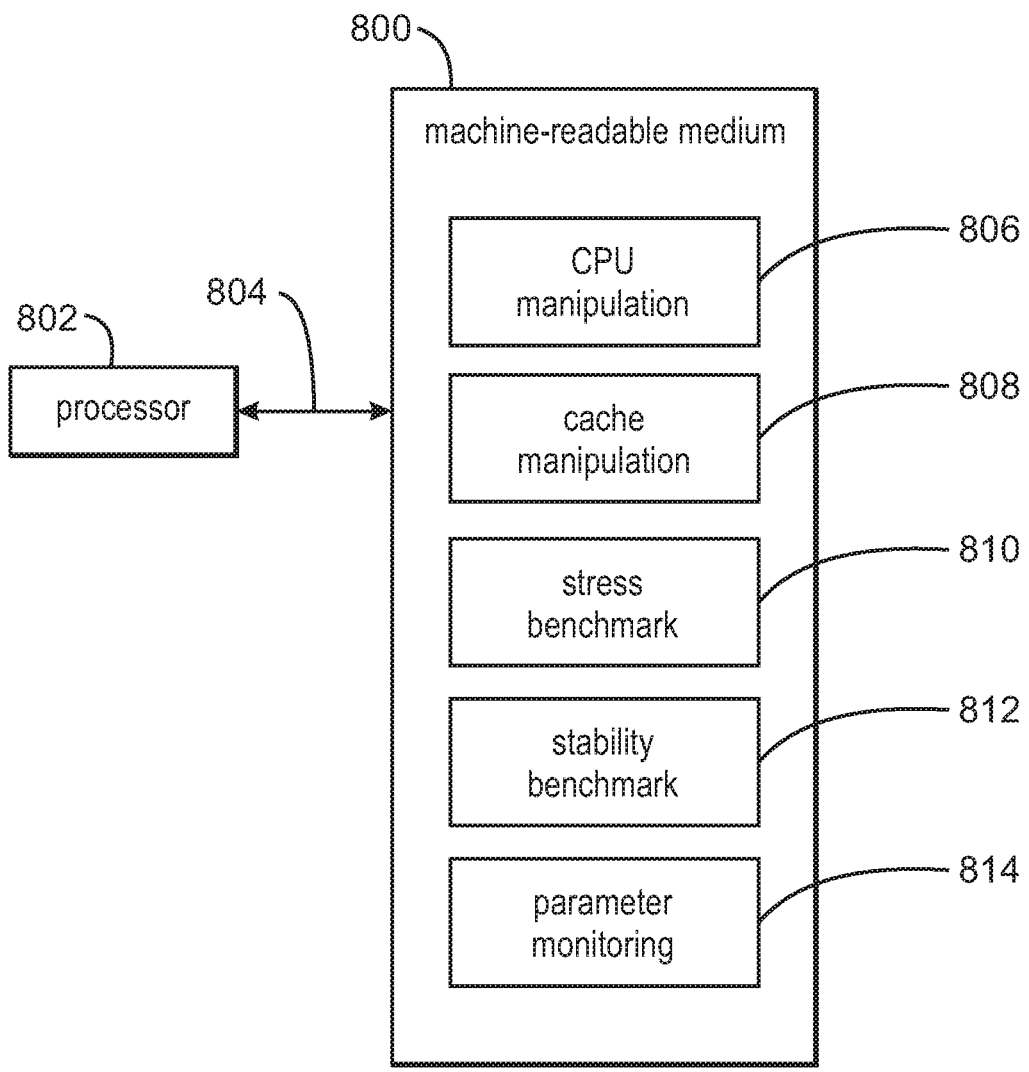
FIG. 8 is a block diagram of a non-transitory, machine-readable medium for performing the automatic overclocking of FIG. 1, according to examples.

FIG. 8 is a block diagram of a non-transitory, machine-readable medium for performing the automatic overclocking system of FIG. 1, according to examples. A processor 802 may access the non-transitory, machine readable medium over a reader mechanism, as indicated by arrow 804.

The non-transitory, machine readable medium 900 may include code, specifically modules 806, 808, 810, and 812, to direct the processor 802 to implement operations for performing the automatic overclocking system. CPU manipulation 806 repeatedly increments the CPU frequency or voltage and monitors parameters and operating limits of the system under test, until a CPU frequency ceiling has been reached. Cache manipulation 808 repeatedly increments the cache frequency or voltage and monitors parameters and operating limits of the system under test, until a cache frequency ceiling has been reached. Once the CPU and cache manipulations are completed, a stress benchmark 810 is run to determine if the system under test is stable at the frequencies. At several points during the CPU and cache manipulations, a stability benchmark 812 is run, and parameter monitoring 814 is performed.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A method of a system comprising a hardware processor, comprising:
    running a stability benchmark of a computer system to obtain an initial CPU frequency of a central processing unit (CPU) of the computer system, wherein the CPU is unlocked;
    incrementally increasing a CPU frequency from the initial CPU frequency and running the stability benchmark at each incrementally increased CPU frequency of a plurality of incrementally increased CPU frequencies until the computer system is no longer operating within an operational limit indicated by the stability benchmark;
    setting a current CPU frequency of the computer system before the operational limit is reached, the current CPU frequency being one of the plurality of incrementally increased CPU frequencies;
    incrementally increasing a CPU voltage from an initial CPU voltage until the computer system fails;
    reducing a CPU frequency from the current CPU frequency to a reduced CPU frequency; and
    running a stress benchmark using the reduced CPU frequency, resulting in a first CPU benchmark score, wherein the stress benchmark is a more rigorous test than the stability benchmark.

2. The method of claim 1, comprising updating a configuration of the computer system based on the first CPU benchmark score and the reduced CPU frequency.

3. The method of claim 2, further comprising:
    incrementally increasing a cache frequency and running the stability benchmark at each incrementally increased cache frequency of a plurality of incrementally increased cache frequencies until the computer system is no longer operating within the operational limit indicated by the stability benchmark;
    setting a current cache frequency of the computer system before the operational limit is reached;
    incrementally increasing a cache voltage from an initial cache voltage until the computer system fails; and
    producing a cache benchmark score based on running the stress benchmark using a selected cache frequency of the plurality of incrementally increased cache frequencies.

4. The method of claim 3, wherein the configuration of the computer system is updated further based on the cache benchmark score and the selected cache frequency.

5. The method of claim 4, further comprising:
    for each combination of a CPU frequency, a cache frequency, a CPU voltage, and a cache voltage, repeatedly running the stress benchmark, resulting in respective benchmark scores.

6. The method of claim 5, wherein the configuration of the computer system is updated based on a selected benchmark score of the respective benchmark scores.

7. The method of claim 3, wherein reducing the CPU frequency is performed once a cache voltage limit is reached.

8. The method of claim 6, further comprising:
    reducing a cache frequency once a cache voltage limit is reached.

9. The method of claim 1 further comprising:
    determining a step size for incrementally increasing the CPU frequency.

10. The method of claim 1, comprising:
    determining a window of CPU frequencies, wherein the reduced CPU frequency is a first CPU frequency of the window of CPU frequencies; and
    running the stress benchmark using a second CPU frequency of the window of CPU frequencies, resulting in a second CPU benchmark score.

11. The method of claim 10, wherein the window of CPU frequencies is determined based on a highest of the plurality of incrementally increased CPU frequencies at which the computer system is no longer operating within the operational limit indicated by the stability benchmark.

12. The method of claim 10, comprising:
    evaluating benchmark scores produced by the stress benchmark for respective CPU frequencies of the window of CPU frequencies, the benchmark scores comprising the first and second CPU benchmark scores; and
    based on the evaluating, selecting a CPU frequency of the window of CPU frequencies as an overclocking CPU frequency to use in the computer system.

13. A system comprising:
    a processor; and
    a non-transitory storage medium storing instructions executable on the processor to:
        incrementally modify a central processing unit (CPU) frequency of a CPU to a plurality of CPU frequencies;
        incrementally modify a CPU voltage of the CPU to a plurality of CPU voltages;
        run a stability benchmark at each CPU frequency of the plurality of CPU frequencies and at each CPU voltage of the plurality of CPU voltages;
        identify, based on the stability benchmark, a CPU frequency, of the plurality of CPU frequencies, at which a computer system is no longer operating within an operational limit;
        set a given CPU frequency that is reduced from the identified CPU frequency; and
        run a stress benchmark using the given CPU frequency to produce a first CPU benchmark score, wherein the stress benchmark is a more rigorous test than the stability benchmark.

14. The system of claim 13, wherein the instructions are executable on the processor to monitor:
   a temperature change of the computer system; and
   a utilization by the CPU.

15. The system of claim 13, wherein the instructions are executable on the processor to:
   modify a cache frequency and a cache voltage;
   run the stability benchmark using the modified cache frequency and the modified cache voltage.

16. The system of claim 13, wherein the instructions are executable on the processor to:
   determine a window of CPU frequencies, wherein the given CPU frequency is a first CPU frequency of the window of CPU frequencies; and
   run the stress benchmark using a second CPU frequency of the window of CPU frequencies, resulting in a second CPU benchmark score.

17. The system of claim 16, wherein the window of CPU frequencies is determined based on a highest of the plurality of CPU frequencies at which the computer system is no longer operating within the operational limit.

18. The system of claim 16, wherein the instructions are executable on the processor to:
   evaluate benchmark scores produced by the stress benchmark for respective CPU frequencies of the window of CPU frequencies, the benchmark scores comprising the first and second CPU benchmark scores; and
   based on the evaluating, select a CPU frequency of the window of CPU frequencies as an overclocking CPU frequency to use in the computer system.

19. A non-transitory machine-readable medium comprising instructions that upon execution cause a computing device to:
   incrementally modify a central processing unit (CPU) frequency of a CPU to a plurality of CPU frequencies;
   incrementally modify a CPU voltage of the CPU to a plurality of CPU voltages;
   run a stability benchmark at each CPU frequency of the plurality of CPU frequencies and at each CPU voltage of the plurality of CPU voltages;
   identify, based on the stability benchmark, a CPU frequency, of the plurality of CPU frequencies, at which the computing device is no longer operating within an operational limit;
   set a given CPU frequency that is reduced from the identified CPU frequency; and
   run a stress benchmark using the given CPU frequency to produce a first CPU benchmark score, wherein the stress benchmark is a more rigorous test than the stability benchmark.

20. The non-transitory machine-readable medium of claim 19, wherein the instructions upon execution cause the computing device to:
   determine a window of CPU frequencies, wherein the given CPU frequency is a first CPU frequency of the window of CPU frequencies; and
   run the stress benchmark using a second CPU frequency of the window of CPU frequencies, resulting in a second CPU benchmark score.

21. The non-transitory machine-readable medium of claim 20, wherein the window of CPU frequencies is determined based on a highest of the plurality of CPU frequencies at which the computing device is no longer operating within the operational limit.

22. The non-transitory machine-readable medium of claim 20, wherein the instructions upon execution cause the computing device to:
   evaluate benchmark scores produced by the stress benchmark for respective CPU frequencies of the window of CPU frequencies, the benchmark scores comprising the first and second CPU benchmark scores; and
   based on the evaluating, select a CPU frequency of the window of CPU frequencies as an overclocking CPU frequency to use in the computing device.

* * * * *